C. I. HALL.
THERMOSTATIC REGULATOR.
APPLICATION FILED MAR. 31, 1919.
1,347,329.
Patented July 20, 1920.
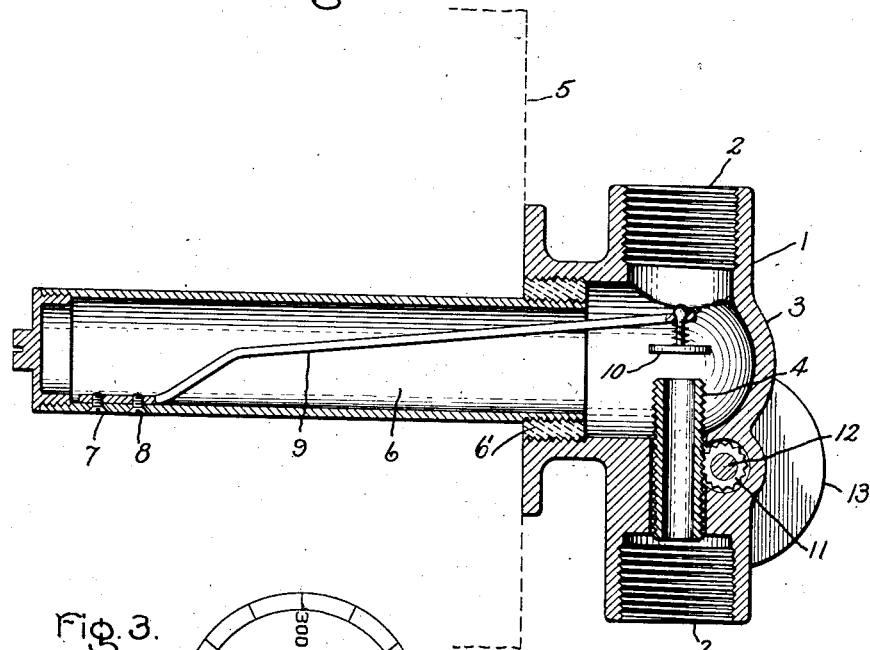
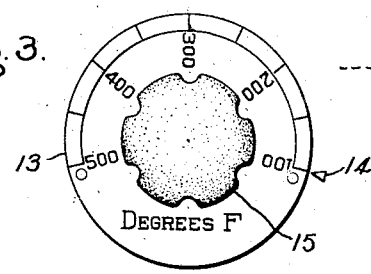
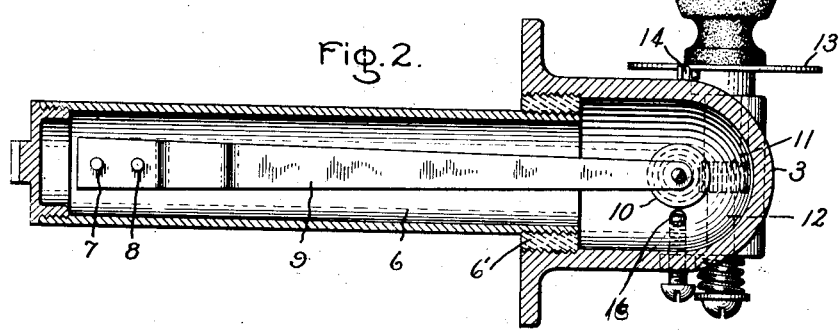
Inventor:
Chester I. Hall,
by Albert G. Davis
His Attorney.

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

THERMOSTATIC REGULATOR.

1,347,329.  Specification of Letters Patent.  Patented July 20, 1920.

Application filed March 31, 1919. Serial No. 286,438.

*To all whom it may concern:*

Be it known that I, CHESTER I. HALL, a citizen of the United States, residing at Fort Wayne, in the county of Allen, State of Indiana, have invented certain new and useful Improvements in Thermostatic Regulators, of which the following is a specification.

My invention relates to thermostatic means for controlling the passage of fluid and has for its object the provision of a device of this character which will control the passage of fluid in accordance with variations in temperature in a reliable, simple and efficient manner.

While my invention is capable of a broader application, it is particularly well adapted for controlling the flow of gas used for heating purposes. In gas stoves and ranges it is frequently desirable to control the temperature automatically, as for instance, in the case of gas heated ovens. A thermostatic device for this purpose must be proof against leaks to the atmosphere and to this end should eliminate stuffing boxes which in addition to furnishing frequent sources of trouble due to leakage also cause excessive friction which interferes with the free operation of the valve.

In carrying out my invention I locate the thermostatic element and valve within the casing containing the gas, the valve being in the passage to be controlled while the thermostatic element is preferably not in the direct passage so as to be cooled by the flow of gas. A valve seat is arranged in the passage so as to coöperate with the valve. The valve is thus perfectly free to move in response to changes of temperature without friction. I adjust the valve seat toward and away from the valve thereby making it unnecessary to interfere with the thermostatic element which, as before stated, is in the gas chamber. In one particular form of my invention I employ a pipe coupling which may be connected into the piping of a gas range. A chamber thermally insulated from the pipe coupling communicating with and secured to the pipe is adapted to enter the oven or other heated space. This chamber incloses the thermostatic element which extends into the gas passage in the coupling and a valve seat is secured to the thermostatic element at this point so as to coöperate with the adjustable valve seat, the thermostatic element being freely movable with respect to the coupling and chamber without friction. The device thus provided is self-contained and may be used with standard pipe fittings. In order to maintain a constant flow of a small amount of gas to keep the flame burning, I provide a by-pass of restricted opening around the valve. Other objects and features of my invention will appear in the course of the following specification in which I have shown my invention embodied in concrete form for purposes of illustration.

In the accompanying drawings, Figure 1 is a vertical section of my invention; Fig. 2 is a horizontal section of Fig. 1, with parts in elevation; and Fig. 3 is a view of the adjusting handle and indicating dial.

Referring to the drawings, the pipe coupling 1 is provided with a gas passage 2 and a valve chamber 3, in which an adjustable valve seat 4 is located. It will be observed that this coupling is without the oven indicated by the broken line 5 and screwed to a gas chamber 6 which extends into the oven and which also forms a closed continuous chamber with valve chamber 3, as shown in Fig. 1. The gas chamber 6 is insulated thermally from the pipe coupling 2 by means of the sleeve 6' of refractory material between the chamber and the pipe coupling. This will prevent the temperature of the chamber from being influenced by the temperature of the pipe coupling or the temperature of the outside air. In the chamber 6 I have rigidly secured at one end by screws 7 and 8 a thermostatic element 9 made of thermostatic metal, now well known in the art, which extends freely into the valve chamber 3 so that it may move in response to changes in temperature without friction. In the arrangement indicated it will also be seen that the thermostatic element is not cooled by the flow of gas in the passage 2. At its opposite end the thermostatic element supports a valve plug 10 arranged to co-act with the valve seat 4. This plug is loosely supported, with a spring interposed between its base and the thermostatic element, as shown in Fig. 1, so that the valve is self-alining. In Fig. 1 it will be seen that the valve seat 4 is cylindrical in shape, its outer surface forming a rack engaged by a pinion 11. The pinion 11 is rigidly secured to a shaft 12 which carries and frictionally drives dial 13 which indicates its various temperatures by turning dial toward indicating pointer 14 mounted on valve chamber 3. Dial 13 is calibrated to correspond to the various temperatures within the oven. The handle 15 is mounted on the opposite end of the shaft 12 so that when the handle is rotated it will, through the pinion 11, move the valve seat 4 and increase or decrease the distance between it and the valve plug 10, and at the same time move the dial to a corresponding position. Of course, this distance is the distance which the valve must travel before it begins to cut off the flow of gas, which in turn regulates the temperature maintained. Thus it will be readily understood that, as the temperature rises, the thermostatic element will bend in a well understood manner, causing the valve plug 10 to approach the valve seat 4. When the valve is at a certain distance from the valve seat, say for instance, about $\frac{1}{16}''$, it begins to cut off the gas and finally nearly cuts it off. As the temperature falls due to the reduced flow of gas, the thermostatic element will tend to straighten and move the valve away from its seat to restore the normal flow. If, for instance, the indicator were set for 500 degrees, the valve seat would be at its lowest position and the valve must travel its maximum distance before cutting down the flow of gas. Should it be desired to have the temperature in the oven at 200 degrees the indicator would be turned to 200, thereby adjusting the valve seat so that it is nearer to the valve and thus reduce the temperature to which the oven must rise before cutting down the flow of gas and hence the temperature in the oven. The adjustment and arrangement are such that the passage is never actually closed but remains open a sufficient distance to maintain a flow of gas sufficient to take care of radiation losses. By adjusting the pointer to various positions, various degrees of temperature within the oven will be obtained. For any given setting, the temperature will be maintained by the gas flowing through the minimum opening of the valve, but if the radiation losses should be increased or the oven suddenly cooled off as by the opening of the oven door, the valve would immediately open wider to admit more gas. I also provide an opening 16 which may be adjusted to vary the minimum flow of gas.

It will thus be seen that I have provided a very simple and efficient device for automatically regulating the flow of fluid or gas so as to maintain desired temperatures. The device is in the form of a pipe fitting and may be readily connected in to the piping of a gas range or the like, provision, of course, being made for locating the thermostatic element so as to be affected by the temperature.

While I have describd my invention as embodied in concrete form and as operating in a specific manner in accordance with the provisions of the patent statutes, it should be understood that I do not limit my invention thereto as various modifications thereof will suggest themselves to those skilled in the art without departing from the spirit of my invention, the scope of which is set forth in the annexed claims.

What I claim as new and desire to secure by Letters Patent of the United States, is:

1. A thermostatically controlled valve comprising a pipe coupling, a casing secured thereto and thermally insulated therefrom forming a closed chamber communicating with the coupling, a thermostatic element extending to the coupling and having one end secured to the casing, a self-alining valve mounted on the other end of said thermostatic element within the coupling and a valve seat coöperating with the valve to control the passage of fluid.

2. A thermostatically controlled valve comprising a pipe coupling, a casing secured thereto and thermally insulated therefrom forming a closed chamber communicating with the coupling, a thermostatic element mounted in said chamber and extending to the coupling, a valve mounted on said thermostatic element within the coupling, a valve seat coöperating with the valve area and means for adjusting the valve seat toward and from the valve, the said coupling having a by-pass around the valve.

3. A thermostatically controlled valve comprising a pipe coupling having a passage therethrough for the controlled fluid, a casing secured at right angles thereto between the entrance and exit of the said passage forming a closed chamber communicating with the passage through the coupling, a thermostatic element which bends in accordance with changes of temperature, the said element mounted with one end thereof secured to the casing and the free end thereof extending within the coupling so as to be freely movable in the path of the flow of fluid through the coupling as the element bends, a valve seat in the coupling adjustable back and forth in the path of the flow of fluid through the coupling, and a self-alining valve mounted on the free end of the thermosatic element coöperating with the valve seat.

In witness whereof, I have hereunto set my hand this 26th day of March, 1919.

CHESTER I. HALL.